United States Patent
Holcombe et al.

(10) Patent No.: US 11,319,491 B1
(45) Date of Patent: *May 3, 2022

(54) PITCH PROCESS

(71) Applicant: Advanced Carbon Products, LLC, Hitchins, KY (US)

(72) Inventors: Thomas C Holcombe, Hillsborough, NJ (US); David C Boyer, Fleming Island, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/882,277

(22) Filed: May 22, 2020

Related U.S. Application Data (63) Continuation-in-part of application No. 15/899,816, filed on Feb. 20, 2018, now Pat. No. 10,731,084.

(51) Int. Cl.
| | |
|---|---|
| *C10C 3/02* | (2006.01) |
| *B01J 19/18* | (2006.01) |
| *C10C 3/00* | (2006.01) |
| *B01J 19/06* | (2006.01) |
| *B01J 19/24* | (2006.01) |

(52) U.S. Cl.
CPC .............. *C10C 3/026* (2013.01); *B01J 19/06* (2013.01); *B01J 19/1862* (2013.01); *B01J 19/242* (2013.01); *C10C 3/002* (2013.01); *B01J 2219/0004* (2013.01)

(58) Field of Classification Search
USPC .............................. 208/39, 44, 45; 423/447.4
See application file for complete search history.

(56) References Cited

U.S. PATENT DOCUMENTS

| | | | | |
|---|---|---|---|---|
| 4,551,225 A | * | 11/1985 | Dickakian | D01F 9/145 208/22 |
| 4,789,456 A | * | 12/1988 | Tsuchitani | C10C 3/00 208/22 |
| 5,032,250 A | * | 7/1991 | Romine | C10C 3/00 208/39 |
| 5,091,072 A | * | 2/1992 | Tsuchitani | C10C 1/00 208/39 |
| 5,316,654 A | * | 5/1994 | Berkebile | C10C 3/00 208/22 |
| 5,614,164 A | | 3/1997 | Sumner et al. | |
| 6,717,021 B2 | * | 4/2004 | Romine | C10C 3/00 585/5 |
| 6,780,505 B1 | * | 8/2004 | Klett | F24F 5/0035 428/367 |
| 7,318,891 B1 | * | 1/2008 | Malone | C10C 1/19 208/131 |

(Continued)

*Primary Examiner* — Nina Bhat
(74) *Attorney, Agent, or Firm* — Richard D Stone (57) ABSTRACT

A process for making mesophase and/or isotropic pitch. An aromatic rich liquid is charged at high temperature and pressure to a first thermal polymerization reactor to produce an effluent stream which is flashed to remove unconverted or partially converted feed as a vapor yielding a liquid phase enriched in isotropic pitch. The enriched isotropic pitch liquid is charged to a second thermal reactor and reactor effluent flashed to produce mesophase pitch and a vapor phase. The vapor phases from both flashing steps are condensed and combined for recycle of a liquid aromatic rich stream to the first reactor. Flashing from the first reactor cools the liquid phase which is enriched in isotropic pitch. This enriched stream is mixed with a superheated fluid, preferably steam, upstream of the second reactor.

10 Claims, 1 Drawing Sheet

(56) References Cited

U.S. PATENT DOCUMENTS

| | | |
|---|---|---|
| 7,341,656 B1 | 3/2008 | Malone et al. |
| 9,222,027 B1 * | 12/2015 | Malone .................. C10C 3/002 |
| 9,376,626 B1 * | 6/2016 | Malone .................. C10C 3/023 |
| 10,508,240 B2 * | 12/2019 | Mahfouz .................. B01J 8/10 |
| 10,731,084 B1 * | 8/2020 | Malone ................. B01J 19/242 |
| 2015/0076031 A1 * | 3/2015 | Zhao ..................... C10G 31/10 |
| | | 208/40 |

* cited by examiner

PITCH PROCESS

CROSS REFERENCE TO RELATED APPLICATIONS

This application is a continuation in part of our prior application Ser. No. 15/899,816 filed Feb. 20, 2018, which claimed the benefit of prior provisional application No. 62/600,402, filed Feb. 21, 2017. Our two recent patents, U.S. Pat. Nos. 9,222,027 and 9,376,626 are related. These patents and applications are incorporated herein by reference.

BACKGROUND OF THE INVENTION

Our two recent patents, mentioned above, are directed to making isotropic and mesophase pitch respectively. This invention relates to formation of isotropic or mesophase pitch.

Our pending US application was related to a two-stage process for making isotropic and then mesophase pitch. This invention relates to formation of isotropic or mesophase pitch.

Although the process taught in our earlier application proved to be an excellent one for making mesophase pitch, our experimental work showed several areas where the process could be further improved.

Our parent application taught that the second reactor could operate without further heating and that steam could be added anywhere in the process. Analyzing the experimental results, we believed that mesophase formation in the second thermal reactor was dependent to a great extent on particle size and temperature.

We saw some experimental evidence for the proposition that mesophase formation was favored by small particle size and particles bumping together. Mesophase formation seems to occur when small size particles of isotropic pitch, or isotropic partially converted to mesophase pitch, bump into one another. If we could reduce the particle size, and increase the turbulence, we believed we could increase the rate of formation of mesophase. We discovered that using significant amounts of steam or other superheated fluid provided the ideal way to reduce particle size. increase turbulence, and add heat. Added steam also favored rapid vaporization of vaporizable species in the droplets.

We wanted to have two plants running in series to make isotropic pitch and mesophase pitch respectively. The capital investment and to a lesser extent operating cost of having two vapor systems was thus avoided.

We wanted a plant which could operate efficiently and respond to changing feed properties and product demands. The "Holy Grail" of most refinery and petrochemical processes is once through operation with reduced or eliminated recycle of unconverted streams. However, the costs associated with operating a plant at the extreme conditions needed to obtain sufficient conversion to isotropic and mesophase pitch are high for once through operation.

We realized after years of pilot plant work and plant design that it was possible to have a plant which could operate efficiently even with relatively low isotropic or mesophase conversion per pass. The cost of recycling significant amounts of unconverted feed was significant higher, but more than offset by heat conservation measures and the benefits of longer "on stream" times. We developed a new approach to formation of isotropic and then mesophase pitch which is unusually flexible. Treating the process as a whole allowed us to break free from the constraints of prior processes because we did not need high amounts of conversion of feed and could tolerate significant amounts of mesophase contamination of our intermediate product. Phrased another way, the first stage or isotropic pitch forming reactor could be run to make a relatively low grade, low purity isotropic pitch product, and, if desired, we could still make mesophase pitch from this low grade material. In some cases, we would prefer to run the first stage reactor at more severe conditions and produce an isotropic pitch product contaminated with significant amounts of mesophase. This intermediate product has little or no value as isotropic pitch but has increased value as feedstock for a mesophase pitch forming reactor.

BRIEF SUMMARY OF THE INVENTION

Accordingly, the present invention provides a two stage process for producing mesophase pitch from an aromatic liquid comprising thermally polymerizing an aromatic liquid feed comprising at least a portion of two and three ring aromatics by charging said feed to a first stage reactor operating at thermal polymerization conditions including a first stage reactor thermal polymerization temperature high enough to induce thermal polymerization and a pressure high enough to maintain at least a portion of said two and three rings aromatics in the liquid phase for a time sufficient to convert at least a portion of said two and three ring aromatics into isotropic pitch and a minor portion into light normally gaseous hydrocarbons and discharging a first stage reactor effluent, flashing said first stage reactor effluent to reduce said first stage thermal polymerization temperature by flashing from said thermal polymerization reactor effluent at least a majority of said light normally gaseous hydrocarbons in a flash zone having an absolute pressure no more than half the absolute pressure in said first stage thermal polymerization reactor to produce a cooled first stage thermal reactor flash effluent liquid stream having a reduced temperature, mixing said reduced temperature flash effluent liquid stream with a superheated fluid to produce a mixed flash effluent liquid stream, and charging said mixed stream into a second stage reactor at mesophase formation conditions including a pressure no more than half the absolute pressure in said first stage reactor and temperature sufficient to induce conversion of said mixed flash effluent liquid and convert at least a portion of said mixed effluent liquid into mesophase pitch, and recovering mesophase pitch from said second stage reactor as a product.

In another embodiment, the present invention provides a process for thermally polymerizing an aromatic liquid feed comprising at least a portion of two and three ring aromatics comprising thermally polymerizing said feed in an isotropic pitch reactor at conditions including a pressure high enough and temperature low enough to maintain at least a majority of said two and three ring aromatic compounds in the liquid phase and a time long enough and temperature high enough to thermally polymerize aromatics in said feed to produce an isotropic pitch intermediate product, flashing said isotropic pitch intermediate product in a flash vessel operating at flash conditions sufficient to vaporize at least a majority of said two and three ring aromatic compounds remaining in said isotropic pitch intermediate to produce a flashed isotropic pitch intermediate product with an enriched content of isotropic pitch, charging said flashed isotropic pitch intermediate product into a turbulent mesophase pitch reactor operating at thermal polymerization conditions including a pressure less than half that of said pressure in said isotropic pitch reactor and a time and temperature sufficient to convert at least a portion of said flashed isotropic pitch intermediate product to mesophase pitch, discharging said turbulent mesophase pitch reactor into a flash drum or fractionator operating at a lower pressure than the pressure in said isotropic pitch reactor to produce a liquid phase comprising mesophase pitch as a liquid product of the process and a vapor phase comprising at least a portion of said two and three ring and heavier aromatic compounds in said flashed isotropic pitch intermediate product, cooling said mesophase reactor flash drum or fractionator vapor phase to produce at least one condensed liquid phase comprising said two and three ring and heavier aromatic compounds, and recycling said condensed liquid phase to said isotropic pitch reactor.

DETAILED DESCRIPTION OF THE INVENTION

Figure 1:
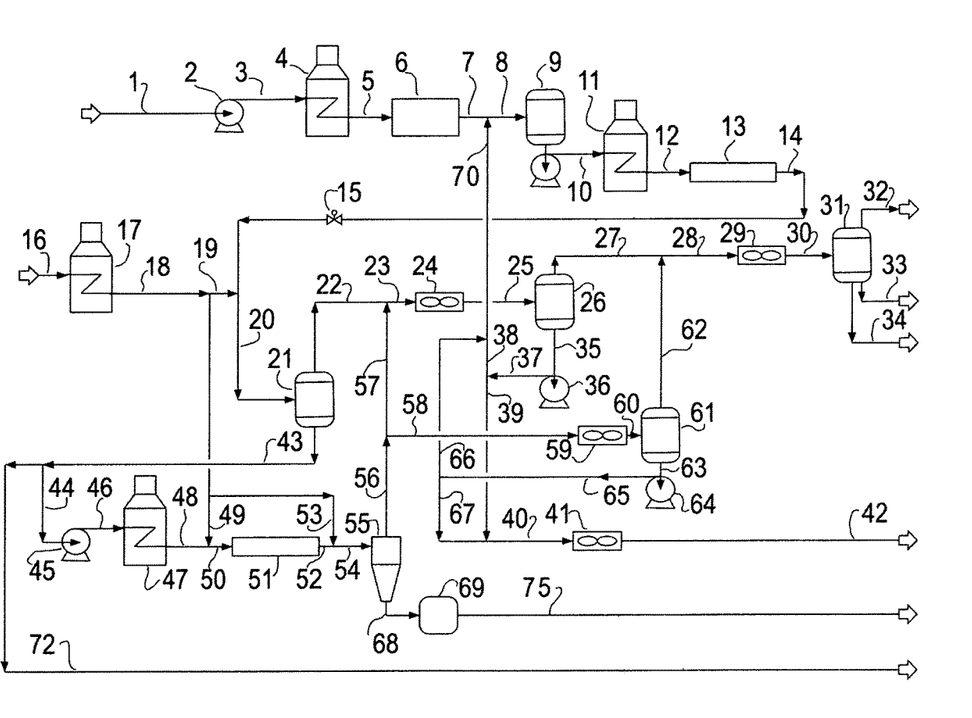
The FIGURE is a simplified view of an embodiment of a two-stage process for producing mesophase pitch from an aromatic liquid.

A fresh feedstock consisting of a filtered aromatic liquid in line 1 is charged via pump 2 and line 3 into heater 4 and then via line 5 to filter 6. Filtered feed is charged via line 7, and an optional recycle stream in line 70, and line 8 into tank 9 and pumped via line 10 into heater 11. The heated feed, now at thermal polymerization temperature, is charged via line 12 into thermal reactor 13 and discharged via line 14, preferably through optional pressure reducing valve 15, and stripping steam is added via line 19. The resulting mixture is charged via line 20 into first stage reactor effluent flash separator 21. Flash separator 21 is an important part of the process, removing both light ends produced as a result of thermal reactions and significant amounts of unconverted, or only partially converted, feed. Flashing concentrates an isotropic pitch enriched liquid fraction, creating an ideal feed, and one which could be at or near an ideal temperature, for use as feed to a mesophase forming reactor. Flash separator 21 vapors are removed overhead via line 22 while the flash separator bottoms fraction, rich in isotropic pitch, is removed via line 43 and charged via line 44 and pump 45 and line 46 into heater 47. If desired, a portion of the liquid product may be removed via line 43 and 72 and recovered as a product of the process. Normally most, or all, of the isotropic pitch rich liquid from the first thermal reactor will be charged to the second thermal reactor.

From heater 47 the isotropic pitch fraction from the flash drum is charged via line 48, and preferably mixed with superheated vapor, preferably superheated steam, from line 49 and the resulting superheated vapor and isotropic pitch liquid mixture charged via line 50 into a second reactor, mesophase forming reactor 51 where much of the isotropic pitch is converted to mesophase pitch. Reactor effluent is discharged via line 52 and optionally mixed with superheated fluid added via line 53 and charged via line 54 into cyclone separator 55. The cyclone separator vapors removed via line 56 contain not only the superheated vapor added upstream of the reactor or cyclone but also some light ends created by dealkylation or other reactions in the mesophase forming reactor 51 and significant amounts of un- or partially-converted heavy aromatics in the feed to thermal reactor 51. As previously noted, the separators play an important part of the combined process. The flash separator associated with the first thermal reactor creates an isotropic pitch rich feed for the mesophase forming reactor. The flash separator associated with the mesophase forming reactor can easily create a mesophase pitch product, or something near to that, by flashing off both light ends and unconverted or partially converted isotropic pitch, resulting in a liquid phase with a desired purity which is removed via line 68 cooled in cooling means 69 and recovered via line 75 as a product of the process.

The above review primarily followed the heavy liquid phase reactants and products, but the lighter fractions will now be reviewed. The vapor flashed from the isotropic pitch reactor effluent vapor separator 21 is charged via line 22, preferably mixed with overhead vapor from cyclone 56, and charged via line 23 through cooler 24 and line 25 into vapor liquid separator 26. Preferably this is run at a temperature high enough to keep any water present in the vapor phase. This vapor phase will also have a relatively small amount of gaseous hydrocarbons and light distillate material produced in reactor 13. The liquid fraction in V/L separator 26 is removed via line 35 and charged via pump 36 and lines 37 and 38 to mix with incoming fresh feed in line 7. If desired a portion of liquid from separator 26 fraction may be removed via lines 39, 40 and cooler 41 for recovery as a product of the process. Preferably much or all of the liquid withdrawn from separator 26 is recycled to the isotropic pitch forming reactor. The vapor fraction is removed from separator 26 via line 27, 28, cooler 29 and line 30 and discharged into separator 31. Preferably the temperature and pressure in this vessel are sufficient to condense steam and most of the hydrocarbons. Water is withdrawn via line 34 while a light distillate hydrocarbon product is recovered via line 33. Normally gaseous hydrocarbons are removed overhead via line 32. The vapor phase from the mesophase forming reactor vapor/liquid separator 55 may be commingled via lines 56 and 57 with vapors from the first stage reactor separator in line 22. Alternatively, the vapors from separator 55 may be charged via lines 56 and 58 into cooler 59 and line 60 into vapor liquid separator 61. The vapor phase from separator 61 may be conveyed via line 62 to mix with the vapor phase from separator 26. The liquid phase from separator 61 is removed via line 63 and pump 64 for recycle to the first stage reactor inlet via line 65, 66 and 70 to mix with fresh feed in line 7 being charged to the isotropic pitch reactor. Some of the liquid phase from separator 61 may be recovered via lines 65, 67, 40 and cooler 41 and cooled liquid discharged via line 42.

Boiler feed water, or other fluid, is charged via line 16 into heater 17 to produce superheated fluid in line 18. The primary function of superheated fluid added via line 49 to line 50 is to mix with the feed to the mesophase forming reactor. Used superheated fluid, we can reduce or even eliminate heating in heater 47. If no heater 47 is required, it will never foul and shut down the process. If some heating is desired the heater is not constrained to supply all the heat needs of the mesophase forming reactor. In that sense it is much like a home hot water heater. If the home heater setpoint is high there is an increased risk of scalding. If the home heater can be set to a milder temperature it is much safer. The comparison is not perfect in that the danger in the home water heater is the risk to users while in a refinery it is to reduce equipment fouling.

Superheated fluid may also beneficially be used in other parts of the process, e.g., charged to the effluent from the first thermal reactor via line 19 to help stripping of vapors from normally liquid hydrocarbons in separator 21. Superheated vapors may also be mixed with the effluent from the mesophase forming reactor via line 53 upstream of the cyclone to improve cyclone performance and also aid in stripping vaporizable material in the cyclone. The cyclone recovers very high boiling hydrocarbon vapor from the mesophase rich liquid fraction, with some of the removed or vaporized material being in the heavy distillate boiling range and even including some isotropic pitch material.

The details on feed, products and reaction conditions in tubular reactors are described in our related earlier patents, incorporated by reference and not repeated here.

For the avoidance of doubt, when wt % of various products at various stages is given the term refers to what would normally be measured or observed in a commercial refinery. When an intermediate product is concerned such as the flash liquid from the first or second thermal reactor, wt % refers to the wt % of a given compound that would be observed or found using any conventional sampling procedure: As an example, the first thermal reactor flash effluent liquid could be sampled from a line leading to a storage tank or sampled from the storage tank. Another example is the mesophase reactor effluent. This flows quickly through the reactor, less quickly in an expansion zone leading to a cyclone, and collects in a separator vessel or drains down a cyclone dipleg.

In this invention, mesophase formation occurs throughout the process, extraordinarily quickly in the mesophase reactor, somewhat more slowly as the reactor effluent expands and cools and enters the cyclone, and at a greatly reduced rate once collected in the liquid phase usually at a significantly lower temperature than that experienced in the mesophase reactor. No attempt is made to capture transient samples within the thermal reactor, the expansion zone or the cyclone separator. A liquid sample would simple be taken from the cyclone dipleg or from a pipe leading to a tank. As an example, a mesophase product sample would usually be taken from a transfer line to a product storage facility. The mesophase wt % content of a given sample will be somewhat different, usually lower, if taken somehow at the outlet of the mesophase reactor or within the cyclone separator. Our claims, and the teachings herein, are directed to product samples as they are normally taken in a refinery and ignore transients or further product formation that occurs in all refinery processes.

First Stage

A tubular reactor and relatively high pressure are preferred, as discussed in the parent patent application. Other operating conditions are discussed in that application. While our process can work well operating the first stage or first thermal reactor as in the parent application, it will sometimes be beneficial so that significant mesophase is produced in the first stage reactor.

In some cases, it will be beneficial to push the first stage very hard and make an intermediate or isotropic rich product that is significantly "contaminated" with mesophase pitch. This "contamination" cannot be tolerated in a plant making isotropic pitch product, but is not a problem in our process since the liquid effluent from the first reactor is directly charged into the second reactor to make mesophase pitch.

Our process tolerates relatively low conversions of aromatic rich liquids to isotropic pitch product in the first stage reactor. This can be done by relying on the flash separation process to remove more unconverted or partially completed material and concentrate the isotropic pitch rich liquid phase to the desired level. We can tolerate low conversion in the first and even in the second stage because we have the ability to flash or fractionate three to five ring aromatics from the second stage reactor effluent. Flashing off or fractionating the relatively heavy but vaporizable molecules allow production of a satisfactory mesophase pitch product.

In our earlier patents, we tried to limit mesophase content in the first stage reactor effluent to 1 wt % or less. While this is a valid and excellent approach when isotropic pitch is the desired product, it is possible to make little or no mesophase by shifting this work to the second stage reactor. When maximum production of mesophase is important, it is possible to produce a first stage effluent with a very high mesophase content, in excess of 10 wt %, 20 wt %, 25 wt %, 35 wt % or more. This approach works the first stage very hard so that the second stage has an easier job of converting the liquid effluent from the first stage to the desired mesophase content in the mesophase pitch product.

We prefer a tubular reactor for the use in the first stage reactor, but this reactor can be a continuously stirred tank reactor (CSTR), the chemistry and general approach are similar, but there are different constraints and concerns. Mesophase pitch is closer to coke than isotropic pitch so to reduce fouling concerns the wt % mesophase from a CSTR first stage will usually be less than when a tubular reactor is used for the first stage.

As discussed in our parent application the pressure in the first stage should be high to keep more two or three ring aromatics in the liquid phase. These aromatic materials can be converted to isotropic pitch, but generally only when they are in the liquid phase.

Second Stage

The second stage can operate as described in our earlier patent on mesophase production when a tubular reactor is used. The parent application taught possible once through operation, relying on the first stage reactor heater to heat things enough to supply the heat needs of the second stage reactor. We have discovered that it is no longer necessary to "push" the first stage reactor to this extent. We also can reduce or eliminate the amount of heating required in the second stage reactor. This can be done by using a superheated fluid such as superheated steam to supply the heat needed in the mesophase forming stage and also to augment turbulent flow. Thus, we can still operate the process without a second heater in the second stage reactor by using superheated steam.

The amount of superheated fluid depends on the temperature of the superheated fluid, the temperature of stream 46 and the desired temperature in line 50. In our experiments, we preferred to use around a 1:1 weight ratio of superheated steam to hydrocarbon. The steam supplied the heat needs of the process and also ensured that vapor velocity in the tubular reactor was high to reduce fouling and to ensure fully developed turbulent flow. Our flow regime was unusual in that almost the entire reactor was filled with vapor, more than 90%, preferably more than 99% and even 99.9% of the reactor volume was steam or superheated fluid. It might seem that such distancing of isotropic pitch molecules would hinder formation of mesophase, but our work has shown that small droplet size and lots of collisions between droplets led to rapid mesophase formation. It is also likely that a major factor was rapid removal of any distillable or vaporizable hydrocarbons in the pitch droplets. It is also possible that our understanding of mesophase pitch forming mechanisms is wrong, and some other factor is in play which we do not understand. Our experiments show that if we put in isotropic pitch feeds and maintain these reaction conditions, we can produce excellent yields of mesophase pitch. The average pressure in the second stage should be reduced by at least 50% in absolute terms compared to the average pressure in the first stage.

In general, a tubular reactor should be used for the second stage, rather than a CSTR. We believe but have not directly proven that small droplet size and collision of these droplets in the reactor is the primary mechanism of our rapid mesophase pitch formation. We surround both reactors with molten metal and put electric heaters on the outside in an attempt to provide isothermal operation. Preferably there is no external heating for the second stage reactor because newly formed mesophase droplets tend to coke on hot surfaces. Both the first and the second stage reactors can run with a relatively low conversion of feed to isotropic pitch in the first reactor effluent and mesophase pitch in the second reactor effluent. We prefer to make our final mesophase pitch quality in a single pass, for example, making 75% mesophase content pitch. The light ends and the isotropic pitch in the vapor phase, based on equilibrium at about 500° C., will end up in the overhead vapors and most will be recovered in the heavy distillate or light distillate. In one embodiment of our invention, a low conversion of isotropic to mesophase pitch can be tolerated as the non-mesophase materials can be vaporized and recycled. These materials could be recycled to the inlet of the second stage reactor, but we have found this to be a poor use of them. The source of these recycled materials is a vapor, and they are readily vaporized in the conditions which exist in the second stage reactor. Only limited conversion of the two and three ring aromatics is believed to occur in the second stage reactor, which reactor is efficient at converting isotropic pitch into mesophase pitch, but not at converting two and three ring aromatics into mesophase pitch. Thus, the vapors from the second stage reactor effluent are not well used if an attempt is made to recycle them to the second stage reactor.

Then vapors rich in two and three ring aromatics obtained from the flash drum of the second stage reactor make an ideal recycle stream to the first stage reactor. This is an unusual approach because usually unconverted material from a reactor is recycled to the reactor from which it came. Here we skip the second stage thermal reactor and recycle the aromatic rich liquids to the first stage thermal reactor.

Heat Balance

The heat requirements of the second stage of the process are significantly but not totally supplied by energy in the liquid feed. The feed to and the product from the first stage reactor can tolerate significant conventional heating, e.g., in a fired heater or immersion in a molten metal or molten salt bath. The thermal reactions occurring in the first reactor are largely governed by time and temperature. Reaction rates roughly double for every 10° C. temperature increase so running the first reactor hotter can permit reduction in the reactor size.

The first stage reactor effluent will cool significantly when flashed to remove light ends and two, three, four ring and even heavier ring aromatic compounds. The residual liquid from this flash will still be very hot, in some cases hot enough to induce mesophase formation in the second stage reactor. We prefer to heat the liquid from the first stage flash separator with superheated fluid, preferably superheated steam as it is charged to the second stage mesophase forming reactor. The second stage reactor operates at much lower pressure than the first stage so construction costs can be reduced significantly because of lower pressure operation. The reactor residence time may be increased by using a larger inside diameter and/or longer length tube reactor.

Additional residence time in the second stage reactor may be achieved by using multiple reactors in series. Mesophase formation reactor vapor effluent is not a good material to recycle to the mesophase forming reactor, but this effluent vapor is an ideal material to recycle to the first or isotropic pitch forming reactor.

We prefer to supply much or even most of the energy needs of the process via a fired heater or other heat source upstream of the first stage thermal reactor. We prefer to avoid a fired heater upstream of the second stage or mesophase forming reactor because mesophase readily forms coke on hot metal surfaces. We prefer adding superheated fluid to the charge stock entering the mesophase forming reactor. This gives additional flexibility to the process. If the first stage reactor heater starts to foul, the process can keep running if superheated steam is injected upstream of the second stage reactor. Poor conversion in the first stage can offset by the operation of a flash separator associated with the first stage reactor. More volatile materials such as un-converted or partially-converted feedstock can be vaporized, thus purifying and concentrating the isotropic pitch material recovered from the first stage flash vessel.

Fluid dynamics in the second stage reactor is believed to be an important factor contributing to the success of our process. Turbulent flow and the intense agitation and mixing associated therewith reduces droplet size in the second stage reactor. We believe that small droplets colliding, is the quickest way to form mesophase pitch. This is the opposite approach of the conventional method of forming mesophase from isotropic pitch in a large pot for many hours without turbulent flow.

Illustrative Embodiment

The following plant mass balance does not represent an actual experiment, but is based on our estimates of reaction rates and computer software estimates of the vaporization of various streams. A simplified heat and weight balance is presented in the following table.

| | MASS BALANCE TABLE PLANT MASS BALANCE | | | | | |
|---|---|---|---|---|---|---|
| | Drawing Line Number | | | | | |
| | 1 Petroleum Feed | 70 Heavy Distillate Recycle | 12 FIRST Reactor Feed | 14 FIRST Reactor Effluent | 43 Total FIRST Pitch | 50 SECOND Reactor Feed |
| Temperature, deg C. | 129 | 173 | 544 | 546 | 490 | 546 |
| Pressure, kPa | 103 | 345 | 7,584 | 7,239 | 310 | 689 |
| Flow rate, metric tons per year | | | | | | |
| H2O | 0 | 0 | 0 | 0 | 0 | 51,356 |
| Gaseous Hydrocarbons | 0 | 0 | 0 | 25,162 | 0 | 0 |
| Light Distillate boiling range | 0 | 0 | 0 | 2,489 | 0 | 0 |

MASS BALANCE TABLE
PLANT MASS BALANCE

| | | | | | | |
|---|---|---|---|---|---|---|
| Heavy Distillate Boiling Range | 201,749 | 377,281 | 579,030 | 381,525 | 20,487 | 4,185 |
| Isotropic Pitch Molecular Structure | 60,263 | 3,355 | 63,618 | 231,471 | 230,886 | 47,170 |
| Mesophase Pitch Molecular Structure | 0 | 0 | 0 | 0 | 0 | 0 |
| Total | 262,011 | 380,637 | 642,648 | 642,647 | 251,373 | 102,711 |

| | Drawing Line Number | | | | | |
|---|---|---|---|---|---|---|
| | 52 SECOND Reactor Effluent | 75 SECOND Pitch Product | 33 Light Distillate Product | 34 Water Product | 32 Fuel Gas Product | 72 FIRST Pitch Product |
| Temperature, deg C. | 546 | 462 | 84 | 84 | 84 | sa |
| Pressure, kPa | 310 | 172 | 101 | 103 | 138 | 103 |
| Flow rate, metric tons per year | | | | | | |
| H2O | 51,356 | 0 | 0 | 692,878 | 1,125 | 0 |
| Gaseous Hydrocarbons | 514 | 0 | 9 | 0 | 25,667 | 0 |
| Light Distillate boiling range | 514 | 0 | 3,003 | 0 | 0 | 0 |
| Heavy Distillate Boiling Range | 24,651 | 0 | 8,282 | 0 | 0 | 16,101 |
| Isotropic Pitch Molecular Structure | 7,703 | 6,933 | 0 | 0 | 0 | 183,716 |
| Mesophase Pitch Molecular Structure | 17,974 | 18,100 | 0 | 9 | 0 | 0 |
| Total | 102,711 | 25,033 | 11,294 | 692,878 | 24792 | 200,018 |

Discussion

Our process is unusual in that the unconverted material from the second or mesophase forming reactor is recycled not to the reactor which formed it, but to the first reactor. The feedstock consists of smaller polyaromatic hydrocarbons (PAH) having alkyl groups attached to their aromatic rings. One of the alkyl groups is knocked off or dealkylated, creating a very active site on that particular aromatic ring. It condenses or polymerizes with another aromatic ring on a nearby PAH, creating a larger PAH. These same reactions may occur in the second stage reactor to a very minor extent. The predominant reaction in the second stage is the realignment of larger PAH (isotropic molecules) to form crystals. Preferably only a single system is used for the combined overhead vapors from the V/L separators associated with both the first and second reactors. Having only a single vapor handling system significantly reduces the cost and complexity of the plant.

The process of the present invention provides what is believed to be the most cost-effective and robust method of producing mesophase pitch from aromatic liquids. There is a significant benefit achieved by close coupling of the first and second reactor stages. Most of the heat input for our process comes from the heater to the first stage reactor. The feed to this reactor is stable because of the presence of significant amounts of heat stable aromatic liquids and can tolerate a lot of heating without forming excessive coke. Some heat input is required in the second stage thermal reactor, but this can be supplied by injection of superheated fluid, preferably steam. The high boiling isotropic pitch effluent has high coking susceptibility, but the fluids in the second stage reactor never contact a metal surface hot enough to cause coking. Our approach uses only one heater upstream of the first stage reactor for the feed, then adds superheated fluid, usually superheated steam produced separately, to the isotropic pitch as it enters the second stage reactor. Said superheated fluid supplies the remaining heat needs of the process. The isotropic pitch material will experience some cooling in the first stage flash vessel. This flash stage is essential, however, to concentrate the isotropic pitch reactor effluent and produce an isotropic enriched pitch fraction as feed for the mesophase forming reactor.

Our new process is flexible. The product from the second stage reactor may be significantly upgraded by flashing many two, three, and four ring aromatics from the second stage reactor effluent to concentrate the mesophase pitch product.

Many heavy refinery streams contain isotropic pitch which can be recovered simply by fractionation. Indeed, this is a way that some isotropic pitch is produced. In our process, there can be relatively poor conversion of multi-ring aromatics to isotropic pitch and even relatively poor conversion of an inferior isotropic pitch product to produce a satisfactory mesophase pitch using robust flashing. Said flashing removes non-mesophase species and creates a satisfactory mesophase product. There will be significant amounts of recycling required using this approach to remove unconverted material from the first reactor effluent and create a tolerable feed to the second reactor. Significant flashing of second stage reactor effluent is used to achieve the desired product purity. Prior processes could not process these poor feeds.

Discussion/Optimization

We prefer to convert most of the feedstock to isotropic pitch in the first thermal reactor and convert most of the first reactor effluent to mesophase pitch in the second thermal reactor. Profitable operation may be achieved with much lower conversions, provided there is either a market for the by-products or sufficient capital and operating funding to recycle unconverted materials. The threshold for a viable commercial plant is as low as 10 to 15 to 20% conversion of liquid aromatic feed to isotropic pitch. Because of excellent flashing in our process aided by adding steam to the second stage thermal reactor, we can tolerate relatively low conversion in the second thermal reactor to mesophase pitch, with conversions of 20, 30, 40% or more being satisfactory.

A preferred approach is to push the first reactor fairly hard and convert most of the aromatic liquid feed to isotropic pitch, preferably a pitch severely "contaminated" with mesophase, at least 1 wt %, preferably 2, 3, 4, 5, 7, 10, 15, 20 wt % or more. This approach will ensure that most of the readily convertible molecules in the feed are converted to a pitch product. In general, the aromatic liquid feeds used herein will contain significant amounts of two, three, four, or five ring aromatics which have relatively low value/price. The economics of the process are better if this low-cost feed can be converted to higher value mesophase pitch.

Conditions in the first stage reaction zone will preferably include a temperature of 850° to 1000° F., preferably 900° to 950° F., and ideally 925° F. Pressure should be enough to maintain the desired amount of two or three ring aromatics in the liquid phase and preferably from 100 to 3000 psia, more preferably 500 to 2500 psia, ideally 1000 to 2000 psia. Residence time is primarily dependent on temperature and conversion desired, but it will typically range from 10 seconds to 100 minutes, preferably 0.5 to 5 minutes, and ideally 2 or 3 minutes.

Conditions in the second stage reactor will almost invariably involve a significantly lower pressure and shorter residence time. The inlet pressure may range from 300 psia to atmospheric pressure, preferably 40 to 100 psia. Average pressure should be less than half the absolute overall pressure in the first stage reactor, preferably one fourth or one fifth the pressure in the first stage. Residence time in the second stage reactor required to achieve the desired conversion of feed to mesophase will typically be under 20 minutes, preferably less than 10 minutes, more preferably under five or even under two minutes. Considering only the tubular reactor, the residence time can be from 0.01 to 10 seconds, ideally 0.2 to 2 seconds. Residence time of the liquid in the second stage or mesophase forming reactor will be extremely short and may include liquid residence in the reactor, time in any expansion zone between the reactor outlet and the cyclone inlet, and time of the liquid in the cyclone.

The pressure and temperature in the first and second stage reactors lend themselves to a relatively simple commercial process design with most of the heat and pressure added at the inlet of the first reactor. There is enough pressure to get reactants through the first stage reactor and into the flash or second stage reactor. The temperature in the first stage reactor is selected to be high enough so that after flashing, the effluent charged with injection of a superheated fluid to the second stage reactor is raised to the desired temperature. All pressure required to get reactants through the process can be added upstream of the first reactor.

The flash zone is an essential concept to permit vaporization of multi ring aromatics from the isotropic pitch "product", but a flash vessel is not, per se, a requirement. It is possible to flash the isotropic pitch liquid in the cyclone, relying on fluid dynamics. It is also possible to have a flash drum at a pressure sufficiently low to remove most of the two and three rings aromatics from the isotropic pitch discharged into this high-pressure flash drum. The isotropic rich liquid phase from the high-pressure flash drum, with or without steam addition, may be charged into the second stage reactor.

Flow Regimes and Mist Size

Although we have not directly observed what flow is like in our reactors, especially in the second or mesophase forming reactor, we can calculate and estimate flow conditions using published correlations. In our pilot plant, we estimate that our second stage reactor operating at 15 kg/hr feed rate yields vapor and liquid mass fluxes of 121 and 52 kg/sec-m2, respectively. The reason they are not equal, even though the steam/HC ratio is 1:1 by weight is that some of the hydrocarbon is vaporized. We believe these conditions are in the "Dispersed flow" regime, as shown by the Baker Two-Phase Flow Regime Map presented in *Chemical Engineering Fluid Mechanics, Second Edition,* 2001, by Ron Darby, which means a great deal of mist formation. Mist is ideal for our process because small droplets of isotropic pitch causes rapid mesophase formation.

Tatterson, et al in (Tatterson, D. F., Dallman, J. C. and Hanratty, T. F., 1977, Drop Sizes in Annular Gas-Liquid Flows. AIChE J. 23-1, 68-76.) developed the following correlation to estimate the mist droplet size in annular/mist two-phase flow regimes:

$$d/D = 0.106 We^{-1/2} Re^{1/10}$$

Where d=diameter of droplets
D=internal diameter of pipe
We=Weber number of the gas
Re=Reynolds number of the gas When operating our pilot plant at 15 kg/hr feed rate, we used this equation to estimate that the mist droplet size was in the range of 6-18 microns, depending upon where the liquid mesophase pitch surface tension was in range of 0.001 to 0.01 kg/sec$^2$. The surface tension of liquid mesophase pitch at 500° C. is not known and its range was estimated by extrapolation.

Direct Contact Heating/Stripping

A superheated fluid, preferably superheated steam, can be added to supply any heating or stripping needs of the process. Superheated steam can be added in minor amounts, 1 to 10 wt % of the liquid, when little heating is required and modest stripping or removal of two and/or three ring aromatics is required. There is no upper limit on superheated steam addition, with amounts up to 50 wt %, 100 wt %, 200 wt % or more being contemplated when some heating of liquid is desired. Although steam is preferred, other superheated fluids may be used, e.g., hydrogen, normally gaseous hydrocarbons and the like.

Our process has multiple applications. The process can be used to make mesophase pitch from an aromatic oil feed using two plug flow reactors in series, preferably with pressure reduction intermediate the two reactors sufficient to vaporize at least a majority of two or three ring aromatic compounds in the feed or produced by thermal polymerization in the first stage reactor.

In other embodiments, the process may be used to produce an isotropic pitch and a mesophase pitch using two thermal reactors in series. The first thermal reactor should operate at a pressure sufficient to maintain at least a majority of three ring aromatic compounds in the feed in the liquid phase in the first reactor and a temperature sufficient to thermally polymerize at least a majority of three ring and heavier aromatics to isotropic pitch to produce a first reactor effluent comprising isotropic pitch and no more than a predetermined amount of mesophase pitch, typically less than 1 wt %. The first reactor effluent is flashed into a flash drum operating at a pressure sufficiently low to vaporize at least a majority of two ring aromatic compounds present in the first reactor effluent. A portion of flash drum liquid is withdrawn as an isotropic pitch product of the process and the remainder charged to a second thermal reactor operating at a pressure low enough to vaporize at least a majority of two ring aromatic compounds present and for a time and temperature sufficient to convert at least a majority by weight of liquid feed to said second reactor to mesophase pitch. In a preferred embodiment, a superheated fluid such as steam or a hydrocarbon is charged to the second reactor for heating. The first thermal reactor may be either a continuous stirred tank reactor or a tubular reactor. The second thermal reactor preferably is a tubular reactor.

Preferably the pressure in the first stage reactor is from 100 to 3000 psia, more preferably 500-2000 psia, ideally 1000 psia. Preferably the pressure in the second stage reactor is one half, preferably one fourth, more preferably one fifth or less, that of the first stage reactor, even more preferably from 300 psia to sub-atmospheric, ideally from atmospheric to 75 psia.

For maximum production of mesophase pitch, the first stage reactor is preferably run at thermal polymerization conditions sufficient to make a first stage reactor isotropic pitch intermediate product contaminated with sufficient mesophase pitch to make an intermediate product unsuitable for use as isotropic pitch. Preferably, the first stage reactor effluent isotropic pitch intermediate product contains more than 1.0, 1.5, 2, 5, 10, 15, 20, 25, or 30 wt % mesophase pitch.

Flash Vapor Composition

Both of the flash separators in our process remove a lot of material. The heavy distillate fraction in the flash vapors typically has a boiling range comprising 500-850° F., but with more extreme stripping or vacuum flashing or distillation, it could be as broad as 500-1200° F. Although we frequently refer to removing two and three ring aromatic compounds, we typically remove much heavier multi ring aromatic compounds with boiling ranges which correspond roughly to 2.5-4.5 and 2.5-6 aromatic rings, respectively. Sometimes we refer to the heavy distillate as a "3.5 aromatic ring" molecule.

In the first stage reactor, the isotropic pitch forming reactor, the flash vapors comprise unreacted slurry oil, partially converted feedstock, and other relatively high boiling hydrocarbons in the feed.

In the second stage reactor, the mesophase forming reactor, the heavy distillate is primarily composed of the isotropic pitch molecules that did not convert to crystalline mesophase pitch in a single reactor pass. The isotropic pitch molecules and lighter materials were carried over in the second stage flash. We have produced mesophase pitch that contains about 70% mesophase for spinning with the balance of mesophase pitch presumably unconverted isotropic pitch.

Although a petroleum-based feedstock is preferred, such as FCC main column bottoms or ethylene cracker bottoms, for some applications a coal tar feed may be preferred, alone or as part of the petroleum-based feedstock. Coal tar feed is avoided or its use minimized when possible because of toxicity concerns, but for some applications it works better. Coal tar feed may also be a readily available low cost feedstock due to changes in market conditions. As a feedstock for production of isotropic or mesophase pitch, it works well because the lower boiling PAH material is either converted to mesophase pitch or vaporized. The lower boiling PAH are generally converted to higher boiling materials in the course of isotropic pitch formation. Those lower boiling materials not converted are vaporized, effectively removing them from the mesophase product.

When an ultra low carcinogen mesophase pitch product is required, it is possible to operate the flash separators at a higher temperature or a lower pressure to remove more of the lower boiling carcinogenic materials. Rather than heat the liquid from the flash separator, it will usually be preferable to reduce the pressure of the flash separator or pull a vacuum as needed to produce the desired pitch and flash vapor properties, discussed next.

Our process produces several unique aromatic oils. These are the vapor phases recovered from the flash vapor associated with the isotropic pitch reactor and the flash vapor from the mesophase forming reactor. These materials make an excellent recycle stream to the isotropic pitch reactor but also have unique properties, they are oils with very high aromatic contents. The oil phases recovered from these reactors have greater than 80 wt % aromatics, an unusually high aromatic content for an oil product. It will be possible to produce a relatively "green" or low carcinogen flash oil from the isotropic and mesophase reactor flashes. This is done by running the isotropic pitch reactor to achieve relatively high conversion and relatively low pressure in the isotropic pitch reactor flash to remove more of the lower boiling PAH. This concentrates the fed to the mesophase forming reactor, and the feed has a reduced content of carcinogenic materials. The carcinogen content is further reduced by mesophase forming reactions so that both the mesophase pitch product and the aromatic oil obtained from the mesophase reactor flash have significantly reduced carcinogen content.

We prefer to use a relatively low solids content feed such as clarified slurry oil, but even this feed has significant amounts of fine particulates. For some applications, e.g., carbon fibers for electrical conductivity or carbon foam, significant amounts of particulates can be tolerated. For some carbon and graphite materials, removal of solids will be required to achieve desired or required performance and physical properties. For carbon fibers (CF), strength will usually be one of the most important properties, and CF strength is heavily dependent on solids content of the feed. Feed filtration is preferred when a low solids content isotropic or mesophase pitch product is desired.

We claim:

1. A two stage process for producing mesophase pitch from an aromatic liquid comprising
   a. thermally polymerizing an aromatic liquid feed wherein the feed comprises two ring and three ring aromatics by charging said feed to a first stage reactor operating at a pressure to maintain at least a portion of said two and three rings aromatics in the liquid phase and a thermal-polymerization temperature for a time sufficient to convert a portion of said two and three ring aromatics into isotropic pitch and a minor portion into light normally gaseous hydrocarbons and discharging a first stage reactor effluent,
   b. flashing said first stage reactor effluent to reduce said first stage thermal polymerization temperature by flashing from said thermal polymerization reactor effluent at least a majority of said light normally gaseous hydrocarbons in a flash zone having an absolute pressure no more than half the absolute pressure in said first stage thermal polymerization reactor to produce a cooled first stage thermal reactor flash effluent liquid stream having a reduced temperature,
   c. mixing said reduced temperature flash effluent liquid stream with a superheated fluid to produce a mixed flash effluent liquid stream, and
   d. charging said mixed stream into a second stage reactor at mesophase formation conditions including a pressure no more than half the absolute pressure in said first stage reactor and temperature to induce conversion of said mixed flash effluent liquid and convert a portion of said mixed effluent liquid into mesophase pitch, and recovering mesophase pitch from said second stage reactor as a product.

2. The process of claim 1 wherein said first stage reactor is selected from the group of a tubular reactor and a continuous stirred tank reactor.

3. The process of claim 1 wherein said second stage reactor is a tubular reactor.

4. The process of claim 1 wherein the superheated fluid is steam.

5. The process of claim 1 wherein the pressure in said second stage reactor is from 300 psia to atmospheric pressure.

6. The process of claim 1 wherein the pressure in said second stage reactor is from 40 to 100 psia.

7. A process for thermally polymerizing an aromatic liquid feed comprising two and three ring aromatics comprising
   a. thermally polymerizing said feed in an isotropic pitch reactor at conditions including a pressure, and temperature to maintain at least a majority of said two and three ring aromatic compounds in the liquid phase and a time and temperature to thermally polymerize said feed to produce an isotropic pitch intermediate product,
   b. flashing said isotropic pitch intermediate product in a flash vessel operating at flash conditions to vaporize a majority of said aromatic compounds remaining in said isotropic pitch intermediate to produce a flashed isotropic pitch intermediate product with an enriched content of isotropic pitch,
   c. charging said flashed isotropic pitch intermediate product into a turbulent mesophase pitch reactor operating at thermal polymerization conditions including a pressure less than half that of said pressure in said isotropic pitch reactor and a time and temperature to convert a portion of said flashed isotropic pitch intermediate product to mesophase pitch,
   d. discharging said turbulent mesophase pitch reactor into a flash drum or fractionator operating at a lower pressure than the pressure in said isotropic pitch reactor to produce a liquid phase comprising mesophase pitch as a liquid product of the process and a vapor phase comprising said two and three ring and heavier aromatic compounds in said flashed isotropic pitch intermediate product,
   e. cooling said mesophase reactor flash drum or fractionator vapor phase to produce a condensed liquid phase comprising said two and three ring and heavier aromatic compounds, and
   f. recycling said condensed liquid phase to said isotropic pitch reactor.

8. The process of claim 7 wherein at least a majority of said aromatic compounds in said aromatic feed are thermally polymerized in said isotropic pitch reactor.

9. The process of claim 7 wherein vapor phases from said isotropic pitch reactor flash vessel and from said mesophase pitch reactor flash or fractionation are condensed to form liquid phases and said liquid phases are combined and recycled to said isotropic pitch reactor.

10. The process of claim 8 wherein vapor phases from said isotropic pitch reactor flash vessel and from said mesophase pitch reactor flash or fractionation vessel are combined to form a combined vapor phase from both said isotopic pitch reactor and said mesophase pitch reactor, said combined vapor phase is condensed to form a liquid phase which is recycled to said isotropic pitch reactor.

\* \* \* \* \*